United States Patent Office 3,504,043
Patented Mar. 31, 1970

3,504,043
METHOD FOR PRODUCING 1,2-DICHLOROETHANE AND VINYL CHLORIDE FROM ETHYLENE AND HYDROGEN CHLORIDE AND OXYGEN
Naoya Kominami, Yoshiaki Yamasaki, Tokio Sakurai, and Kusuo Kawarazaki, Tokyo, Japan, assignors to Asahi Kasei Kogyo Kabushiki Kaisha, Osaka, Japan, a corporation of Japan
No Drawing. Filed Oct. 6, 1964, Ser. No. 401,985
Claims priority, application Japan, Oct. 7, 1963, 38/52,463; Oct. 8, 1963, 38/52,532; Apr. 8, 1964, 39/19,479
Int. Cl. C07c 21/02, 17/02, 17/10
U.S. Cl. 260—656                                4 Claims This invention relates to a method for producing 1,2-dichloroethane and vinyl chloride from ethylene, hydrogen chloride and oxygen by gas phase catalytic reaction with a high yield.

As for methods producing 1,2-dichloroethane from ethylene, hydrogen chloride and oxygen, there have been known heretofore oxychlorination methods of ethylene. In these conventional oxychlorination methods of ethylene, a Deacon catalyst i.e., a catalyst consisting of a chloride such as cupric chloride or ferric chloride alone, or the same chloride added with an alkali metal salt or a salt of a metal of the lanthanide group has been used. However, the activity of these catalysts are low. If the reaction temperature is raised to increase conversion, side reactions become active, and the yield of 1,2-dichloroethane is exceedingly reduced. If a low temperature is used, side reactions can be retarded, but the contact time must be extended greatly. Otherwise it is impossible to obtain 1,2-dichloroethane with a high one pass yield. Moreover, methods using conventional catalysts have had drawbacks in construction material and the capacity of the reaction tower when they are put into practice in commercial plant.

An object of the present invention is, accordingly, to provide a method for producing 1,2-dichloroethane and vinyl chloride at a relatively short contact time at an exceedingly low reaction temperature and with a high one pass yield by use of a catalyst much more active than the conventional Deacon catalyst. Another object of the present invention is to provide a method which uses a catalyst possessing high activity even at a low temperature and accordingly affords a great advantage in the minimum requirement of the construction material of the reaction tower used in the reaction of corrosive hydrogen chloride. A still further object of the present invention is to provide a method which can increase the capacity of the reaction tower extremely by use of slightly higher temperature. A yet still further object of the present invention is to provide a method which produces 1,2-dichloroethane together with a considerable amount of vinyl chloride but which scarcely produces any other chlorides.

It has now been discovered that these and other objects may be accomplished by the method of the invention. According to the present invention, in the production of 1,2-dichloroethane and vinyl chloride by gas phase reaction, there is used an efficient and active catalyst supported on active carbon consisting of a combination of at least one member of the compound of the group consisting of chlorides, oxides, hydroxides, fluorides, bromides, iodides, sulfides, sulfates, nitrates, cyanides of a metal of the group consisting of gold and platinum, platinum ammonium chlorides and hydrochlroplatinous acid; another member of the group consisting of metallic copper, copper-chlorides, copper-oxides, copper-hydroxides and acetates, sulfides, formate, iodides, bromides, carbonates, chlorates, phosphates, sulfates and oxalates of copper; or a catalyst further combining the above-mentioned catalyst with at least one promoter from the group consisting of chlorides, oxides, hydroxides, nitrates, sulfates, sulfides, carbonates, phosphates and acetates of a metal from the group consisting of silver, zinc, cadmium, chromium, mercury, lead, iron, ruthenium, palladium, osmium, iridium and rhodium, the above-mentioned oxides, hydroxides, nitrates, sulfates, sulfides, carbonates, phosphates and acetates of all metals of the kind readily convertible to chloride. The reaction temperature is in the range of from 80° C. to 300° C., preferably from 100° C. to 200° C.

An important aspect in the practice of the present invention is the necessity of use of active carbon as a carrier. In the general catalytic reaction, substances such as silicagel, active carbon, active alumina, kieselguhr, silicon carbide, magnesium oxide or the like is used as a carrier. However when one of the above-mentioned common carriers other than active carbon is used, or when no carrier is used in the present catalyst system, the activity of the catalytic system is exceedingly low compared with the case in which active carbon is used as a carrier, though both 1,2-dichloroethane and vinyl chloride are formed slightly. Such a difference of activity is much larger than what is expected from the difference of surface area. It is believed that the function of the active carbon is not merely that of a carrier but that its functional groups have a favorable effect on the reaction. In other words the function of the present catalyst and that of the active carbon cooperate in producing 1,2-dichloroethane and vinyl chloride with high activity and high yield. Commercially available active carbon which is not treated in any way, or treated with inorganic acid such as nitric acid, hydrochloric acid or the like can be used as carriers. The catalyst can be prepared preferably by the impregnation method.

The above-mentioned metal chlorides or metal compounds readily convertible to chloride by hydrogen chloride or by a mixture of hydrogen chloride and oxygen, e.g. such as the above-mentioned metals, metal oxides, metal hydroxides, nitrates, sulfates, sulfides, carbonates, phosphates or acetates supported on active carbon can be used as a catalytic system. The amount of catalyst used varies according to the combination. As for the ratio of catalyst such as gold or platinum compound to promotor, the range of from 1 to 100 mol of promotor vs. 1 mol of catalyst is preferable.

It is possible to produce 1,2-dichloroethane and vinyl chloride with excellent activity and high yield by use of a principal catalytic system consisting of at least one member of the group consisting of chlorides, and compounds readily convertible to chloride such as oxides, hydroxides and fluorides, bromides, iodides, sulfides, sulfates, nitrates, cyanides of a metal of the group consisting of gold and platinum, platinum ammonium chlorides and hydrochloroplatinous acid, a metal of the group consisting of gold and platinum; and another member of the group consisting of copper chlorides and substances readily convertible to chlorides, such as metallic copper, copper oxides, copper hydroxides, and acetates, sulfides, formate, iodides, bromides, carbonates, chlorates, phosphates, sulfates and oxalates of copper. However, by further adding a promotor from the group consisting of chlorides, oxides, hydroxides, nitrates, sulfates, sulfides, carbonates, phosphates and acetates of a metal of the group consisting of silver, lead, ruthenium, palladium, osmium, iridium and rhodium, and the metals themselves, it is possible not only to increase the activity, but also to suppress the formation of oxidation products, and various chlorides other than 1,2-dichloroethane and vinyl chloride thereby to increase the yield of 1,2-dichloroethane and vinyl chloride. When at least one chloride or a substance readily convertible to a chloride such as the oxide, hydroxide, nitrate, sulfide, carbonate, phosphate, acetate of a metal from the group consisting of iron, zinc, cadmium, chromium and mercury is added to the above mentioned catalytic system, the activity is slightly increased and the ratio of formed vinyl chloride to 1,2-dichloroethane is increased. It is preferable to select a suitable combination of two promotors having different effectiveness according to the purpose.

In carrying out the method of the invention, it is necessary, as above-mentioned, to maintain the reaction temperature in the range of from 80° C. to 300° C. When the reaction temperature is lower than the above-mentioned range, the reaction rate is decreased, and when the reaction temperature is too high, side reactions predominate and the yield of 1,2-dichloroethane and vinyl chloride is remarkably reduced. Among the by-products produced by the side reactions, are carbon dioxide and chlorides other than the objective substances e.g. trichloroethane, dichloroethylene, ethyl chloride, trichloroethylene and the like. When the preferable range of from 100° C. to 200° C. is used, the above-mentioned drawbacks can be sufficiently prevented. In the above-mentioned temperature range, 1,2-dichloroethane is the principal product but at the higher temperature side, the ratio of formed vinyl chloride to 1,2-dichloroethane is increased.

The reaction can be carried out either at atmospheric pressure or under a pressure as long as the gas phase is maintained at the reaction conditions. As for reaction method, a fixed bed method, a moving bed method, and a fluidized bed method can be used. The yield of 1,2-dichloroethane together with vinyl chloride in the present invention is so high as to be almost quantitative due to the low reaction temperature, there is no scattering of the catalyst and the activity can be maintained almost perpetually.

In order that those skilled in the art may more fully understand the nature of the invention and the method of carrying it out, the following examples are given. Ethylene conversion, 1,2-dichloroethane yield and vinyl chloride yield are defined as follows:

$$\text{Ethylene conversion} = \frac{\text{Ethylene mols reacted}}{\text{Ethylene mols fed}} \times 100$$

$$\text{1,2-dichloroethane yield} = \frac{\text{1,2-dichloroethane mols produced}}{\text{Ethylene mols reacted}} \times 100$$

$$\text{Vinyl chloride yield} = \frac{\text{Vinyl chloride mols produced}}{\text{Ethylene mols reacted}} \times 100$$

EXAMPLE 1

A catalyst was prepared by depositing platinum chloride and cupric chloride upon granulated active carbon having a surface area of 1100 m.$^2$/gr. The resulting catalyst was filled in a reaction tube together with Raschig rings. The platinum chloride and cupric chloride were respectively present in amounts of 0.05 mol and 0.10 mol per 100 g. of carrier. A gaseous mixture having a mol ratio of ethylene, hydrogen chloride, oxygen and nitrogen of 12:28:10:50 was introduced into the reaction tube at a space velocity of 1200 hr.$^{-1}$ and the reaction temperature was maintained at 175° C. The ethylene conversion was 51.3 percent and the 1,2-dichloroethane yield and the vinyl chloride yield were 79.0 percent and 13.5 percent respectively. As by-products and oxidation product and other chloride yields were obtained in amounts of 2.6% and 4.9% respectively.

CONTROL 1

Employing the same catalyst as in Example 1 with various carriers such as silica gel, gamma-alumina, silicon carbide and magnesium oxide instead of active carbon, the reaction was carried out in the same apparatus and under the same reaction conditions as in Example 1. The results are tabulated as follows:

| Kinds of carrier | Surface area (m.$^2$/g.) | Ethylene conversion | 1,2-dichloroethane | Vinyl chloride | Other |
|---|---|---|---|---|---|
| Silica gel | 550 | 12.4 | 38.6 | 45.5 | 15.1 |
| Gamma alumina | 330 | 6.7 | 30.5 | 42.9 | 24.2 |
| Silicon carbide | 0.6 | 1.1 | 90.2 | 6.8 | 3.0 |
| Magnesium oxide | 130 | 2.1 | 45.4 | 34.5 | 20.1 |

EXAMPLE 2

Various catalysts were deposited upon purified granulated active carbon and used in the reaction. The total molar quantity of catalyst was kept at 0.150 mol per 100 g. of carrier. A mixed gas having a mol ratio of ethylene, hydrogen chloride and air of 11:26:63 was introduced into the reaction tube at a space velocity of 1200 hr.$^{-1}$. The reaction temperature was maintained at 180° C. The ratio of the constituents in each case and the results of the reaction are tabulated as follows:

| Kinds of catalysts | Compositions of catalyst | Ethylene conversion | 1,2-dichloroethane | Vinyl chloride | Other |
|---|---|---|---|---|---|
| Pt-Cu-Ru | 1:4:2 | 91.3 | 91.5 | 3.5 | 5.0 |
| Pt-Cu-Ag | 1:4:2 | 90.5 | 94.8 | 2.3 | 2.9 |
| Pt-Cu-Fe | 1:5:1 | 82.3 | 73.0 | 23.1 | 3.9 |
| Pt-Cu-Hg | 1:4:2 | 84.8 | 69.5 | 31.0 | 9.5 |
| Pt-Cu-Cr | 1:5:3 | 80.5 | 48.2 | 43.3 | 8.5 |
| Au-Cu-Pd | 1:2:1 | 88.4 | 96.2 | 2.2 | 1.6 |
| Au-Cu-Cd | 1:2:1 | 74.7 | 84.1 | 13.0 | 2.9 |
| Au-Cu-Zn | 1:2:2 | 78.3 | 80.4 | 14.5 | 5.19 |
| Au-Cu-Ir | 1:2:1 | 90.1 | 97.0 | 1.4 | 1.6 |

EXAMPLE 3

Platinum nitrate and cupric sulfate were deposited upon granulated active carbon. The catalysts deposited upon the active carbon were diluted by mixing with Raschig rings, filled in a reaction tube and used in the reaction. The deposited platinum nitrate and cupric sulfate were 0.0212 mol and 0.242 mol respectively per 100 g. of active carbon. A mixed gas having a mol ratio of ethylene, hydrogen chloride and air of 12:28:60 was introduced into the reaction tube at a space velocity of 1500 hr.$^{-1}$. The reaction temperature was varied as described hereinafter. The reaction reached a stationary state in about one hour. The results are tabulated as follows:

| Reaction temperature, °C. | Ethylene conversion | 1,2-dichloro-ethane | Vinyl chloride | Other |
|---|---|---|---|---|
| 120 | 24.0 | 99.0 | 1.0 | 0 |
| 150 | 57.1 | 96.5 | 3.0 | 0.5 |
| 175 | 81.2 | 87.9 | 8.7 | 2.8 |
| 200 | 93.9 | 74.8 | 19.3 | 5.9 |
| 250 | 95.4 | 67.3 | 18.1 | 14.6 |
| 300 | 97.0 | 61.2 | 17.0 | 21.8 |
| 350 | 97.8 | 40.1 | 12.9 | 47.0 |

CONTROL 2

The reaction was carried out with the same apparatus and the same reaction conditions as in Example 3 at various temperatures except that 0.242 mol of cupric chloride alone was deposited upon 100 g. of granulated active carbon. Results were tabulated as follows:

| Reaction temperature, °C. | Ethylene conversion | 1,2-dichloro-ethane | Vinyl chloride | Other |
|---|---|---|---|---|
| 150 | 1.5 | 99.0 | 0 | 1.0 |
| 200 | 19.9 | 98.5 | 0 | 1.5 |
| 250 | 67.5 | 92.1 | 1.4 | 6.5 |
| 300 | 90.8 | 72.6 | 6.2 | 21.2 |
| 350 | 96.5 | 59.8 | 11.7 | 28.5 |
| 400 | 98.1 | 49.1 | 10.8 | 40.1 |

EXAMPLE 4

Auric chloride and cupric acetate were deposited upon from 50 to 100 mesh active carbon and filled in a reaction tube of 80 mm. diameter to carry out reaction in a fluidized bed.

The deposited auric chloride and cupric acetate were present in respective amounts of 0.0318 mol. and 0.0743 mol per 100 g. of active carbon.

A gaseous mixture of ethylene, hydrogen chloride and air having a mol ratio of 12:28:60 was introduced from the bottom of the fluidized bed and a contact time of 1.5 seconds and a reaction temperature of 220° C. was maintained.

The reaction reached the stationary state in a short time. The ethylene conversion at that time was 47.2 percent, and the resultant 1,2-dichloroethane yield was 93.8 percent and the vinyl chloride yield was 4.3 percent. The sum of these two yields was 98.1 percent and the rest was almost entirely carbon dioxide.

What is claimed is:

1. A method for producing 1,2-dichloroethane and vinyl chloride comprising contacting a gaseous mixture of ethylene, hydrogen chloride and oxygen with a catalyst supported upon an active carbon carrier at a temperature of from 80° C. to 300° C., the said catalyst consisting of at least one member of the group consisting of gold chlorides, metallic gold, gold oxides, gold hydroxides, gold fluorides, gold bromides, gold iodides, gold cyanides, gold sulfides, gold sulfates, gold nitrates, platinum chlorides, platinum metal, platinum oxides, platinum hydroxides and hydrochloroplatinous acid, platinum ammonium chorides, platinum fluorides, platinum bromides, platinum iodides, platinum sulfates, platinum sulfides, and platinic nitrate; and at least one member selected from the group consisting of copper chlorides, metallic copper, copper oxides, copper hydroxides and copper acetates, copper sulfides, cuprous formate, cuprous iodide, cupric bromide, cupric carbonate, cupric chlorate, cupric phosphate, cupric sulfate and cupric oxalate.

2. A method for producing 1,2-dichloroethane and vinyl chloride comprising contacting a gaseous mixture of ethylene hydrogen chloride and oxygen with a catalyst supported upon an active carbon carrier at a temperature of from 80° C. to 300° C., the said catalyst consisting of at least one member of the group consisting of gold chlorides, gold metal, gold oxides, gold hydroxides, platinum chlorides, platinum metal, platinum oxides, platinum hydroxides and fluorides, bromides, iodides, sulfides, sulfates, nitrates, and cyanides of a metal selected from the group consisting of gold and platinum, platinum ammonium chlorides and hydrochloroplatinous acid and at least one second member selected from the group consisting of copper chlorides, metallic copper, copper oxides, copper hydroxides, and copper acetates, copper sulfides, cuprous formate, cuprous iodide, cupric bromide, cupric carbonate, cupric chlorate, cupric phosphate, cupric sulfate and cupric oxalate and at least one third member selected from the group consisting of silver, zinc, cadmium, mercury, lead, chromium, iron, ruthenium, palladium, osmium, iridium and rhodium and the chlorides, oxides, hydroxides, nitrates, sulfates, sulfites, carbonates, phosphates and acetates thereof. Consisting of silver, zinc, cadmium, mercury, lead, chromium, iron, ruthenium, palladium, osmium, iridium and rhodium, and their chlorides, oxides, hydroxides, nitrates, sulfates, sulfites, carbonates, phosphates, and acetates.

3. A method for producing 1,2-chloroethane and vinyl chloride comprising contacting a gaseous mixture of ethylene, hydrogen chloride and oxygen with a catalyst supported upon an active carbon carrier at a temperature of from 80° C. to 300° C., the said catalyst consisting of at least one member of the group consisting of gold, platinum and chlorides thereof and at least one member of the group consisting of copper and the chlorides thereof.

4. A method as claimed in claim 3, further comprising a promoter added to said catalyst selected from the group consisting of silver, zinc, cadmium, lead, chromium, iron, ruthenium, palladium, osmium, iridium and rhodium and the chlorides thereof.

References Cited

UNITED STATES PATENTS

| 3,055,955 | 9/1962 | Hodges | 260—656 |
| 2,308,489 | 1/1943 | Cass | 260—656 |
| 2,838,577 | 6/1958 | Cook et al. | 260—656 |
| 3,291,846 | 12/1966 | Otsuka et al. | 260—656 |
| 3,354,234 | 11/1967 | Hayden et al. | 260—656 |

FOREIGN PATENTS

| 1,143,807 | 2/1963 | Germany. |
| 968,933 | 9/1964 | Great Britain. |

LEON ZITVER, Primary Examiner

H. T. MARS, Assistant Examiner

U.S. Cl. X.R.

252—428, 429, 430, 431, 438, 439, 441, 447; 260—662